United States Patent [19]

Meyer, Jr. et al.

[11] 4,178,272

[45] Dec. 11, 1979

[54] HOT-MELT ADHESVIES FOR BONDING POLYETHYLENE

[75] Inventors: Max F. Meyer, Jr.; Richard L. McConnell; Frederick B. Joyner, all of Kingsport, Tenn.

[73] Assignee: Eastman Kodak Company, Rochester, N.Y.

[21] Appl. No.: 773,565

[22] Filed: Mar. 2, 1977

[51] Int. Cl.[2] ......................... C08L 93/00; C08L 23/14
[52] U.S. Cl. ................................... 260/27 R; 525/210; 525/211; 525/216; 525/241
[58] Field of Search ........................... 260/27 R, 897 A

[56] References Cited

U.S. PATENT DOCUMENTS

| | | | |
|---|---|---|---|
| 3,341,626 | 9/1967 | Peterkin | 260/897 A |
| 3,529,037 | 9/1970 | Hagemeyer et al. | 260/878 B |
| 3,634,546 | 1/1972 | Hagemeyer et al. | 260/897 A X |
| 3,888,949 | 6/1975 | Shih | 260/897 A |
| 3,954,697 | 5/1976 | McConnell et al. | 526/90 X |
| 4,022,728 | 5/1977 | Trotter et al. | 260/27 R |

*Primary Examiner*—Lewis T. Jacobs
*Attorney, Agent, or Firm*—Clyde L. Tootle; Daniel B. Reece, III

[57] ABSTRACT

The hot-melt adhesives of the present invention comprise a blend of poly(propylene-co-higher 1-olefin), tackifying resin and crystalline propylene containing polymer. These hot-melt adhesive compositions have a novel combination of properties including strong T-peel and lap shear bonds to both low- and high-density polyethylene with excellent creep resistance at ambient temperatures. Therefore, these new hot-melt adhesives are excellent adhesives for applications such as sealing high-density polyethylene grocery bags and low-density shipping bags.

8 Claims, No Drawings

HOT-MELT ADHESVIES FOR BONDING POLYETHYLENE

This invention relates to hot melt adhesive compositions having a novel combination of properties. More specifically, the invention relates to a polyolefin-based hot-melt adhesive composition which provides strong T-peel and lap shear bonds to both low- and high-density polyethylene with no creep at 23° C.

Hot melt adhesives produce a bond by mere cooling as distinguished from crosslinking or other chemical reactions. Prior to heating, the hot melt adhesives are solids that can be prepared in bulk or pellet form for ease of handling. Upon heating, the hot melt adhesive composition melts and flows freely for application to a substrate. Since the hot melt adhesives of the present invention are thermoplastic rather than thermosetting, and thus remeltable, they can be applied to a particular substrate and later remelted to form a hot melt bond between this substrate and another substrate.

Hot melt adhesives are useful for bonding various substrates together such as wood, paper, plastics, and textiles, as well as other materials. One use for which they are well suited is the fabrication of bags, cartons and use as an adhesive on floor tile. Polyethylene is used extensively in such applications as carpet backing, grocery bags, and molded articles. In many of these applications a polyethylene-to-polyethylene bond is required. However, polyethylene is an inert, nonfunctional type polymer which is very difficult to bond. Polyethylene film can be heat sealed with or without the aid of surface modifications such as flame treatments or corona discharge at relatively slow rates but not at the high speeds normally encountered in production sealing operations. Ethylene/vinyl acetate-based adhesives have been used to a limited extent in Europe in sealing high-density polyethylene grocery bags but the bonds are weak and unsatisfactory. Therefore, it would be an advance in the state of the art to provide polyolefin based hot-melt adhesives that will provide strong T-peel and lap shear bonds to both low- and high-density polyethylene with excellent creep resistance at ambient temperatures.

In accordance with the present invention, we have found that a blend comprising poly(propylene-co-higher 1-olefin), tackifying resin, and crystalline polypropylene or crystalline propylene containing copolymer, provides a hot-melt adhesive having a novel combination of properties including strong T-peel and lap shear type bonds to both low and high density polyethylene which do not undergo creep at 23° C.

It was found that certain poly(propylene-co-1-hexene) polymers containing a hydrocarbon tackifying resin such as EASTMAN Resin H provides strong T-peel and lap shear bonds with both low- and high-density polyethylene. However, bonds made with these compositions undergo excessive creep under load. Subsequently it was found that when a low molecular weight crystallizable wax such as Epolene N-15 polypropylene is added to the poly(propylene-co-1-hexene)/Resin H blends, the resulting adhesive compositions provide strong T-peel and lap shear type bonds to both low- and high-density polyethylene which do not undergo creep at 23° C.

The poly(propylene-co-higher 1-olefin) useful in the present invention is a substantially amorphous propylene/higher 1-olefin copolymer containing 35 to 65 mole percent higher 1-olefin having a melt viscosity range at 190° C. of 10,000 cp. to 200,000 cop., a density of about 0.85 to 0.86, a glass transition temperature (Tg) of about −30 to −45° C., and an endotherm at about 40°–45° C. may sometimes be detected by Differential Scanning Calorimetry, wherein said higher 1-olefin is a member of the group consisting of 1-hexene, 1-heptene, 1-octene, 1-nonene and 1-decene. The 1-butene/higher 1-olefin copolymers containing 35-65 mole % higher 1-olefin are also useful in the practice of this invention. Such poly(propylene-co-higher 1-olefin) copolymers are disclosed in U.S. Pat. No. 3,954,697.

It was also found that Tg and density measurements are useful for the characterization of useful copolymers. One suitable method for measuring the Tg (glass transition temperature) of polymers is by Differential Scanning Calorimetry [John Mitchell and Jen Chiu, Anal. Chem. Annual Reviews, 43, 267R (1971); M. J. O'Neill and R. L. Fyans, "Design of Differential Scanning Calorimeters and the Performance of a New System", paper presented at the Eastern Analytical Symposium, New York City, November, 1971]. Density of polymers is generally determined in a density gradient tube (ASTM Method D1505). It has been found that useful copolymers have a density of <0.86 and a Tg intermediate between that observed for polypropylene and that of the higher poly-1-olefin. For example, polypropylene has a Tg of about −20° C. and poly-1-hexene has a Tg of about −50° C. (J. Brandrup and E. H. Immergut editors, "Polymer Handbook", Interscience Publishers, New York City, 1966). Useful propylene/1-hexene copolymers containing 40-60 mole percent 1-hexene normally show Tg values of about −30° to −45° C. If the copolymer is too "blocky" (i.e., contains relatively long segments of propylene), the copolymer will have a density of >0.86 and it will show a Tg value closer to that of propylene homopolymer (e.g. about −15° to −20° C.).

The type of catalyst and the polymerization conditions required to provide copolymers having the desired structure are quite limited. In general, the best results have been achieved by using catalyst systems which provide poor stereoregulation in the polymerization of propylene. Combinations of $Et_3Al$ with AA-$TiCl_3$ with Al/Ti molar ratios ranging from about 1:1 to 5:1 have been found to be useful. It is also necessary to conduct the polymerization at high temperatures with the preferred temperature range being 150°–160° C. The operable temperature range is about 130°–170° C. Temperatures below 130° C. usually provide too much blocking even when using $Et_3Al$/$AATiCl_3$ catalysts. The molecular weight (melt viscosity) of copolymers made at temperatures in excess of 170° C. is too low to provide adequate pressure-sensitive adhesive properties.

If catalysts which provide highly stereoregular propylene homopolymer are used to copolymerize propylene and hexene, multiblock copolymers are formed which contain crystallizable propylene segments. Thus, they have inadequate pressure-sensitive adhesive properties. Examples of highly stereospecific catalysts (for the polymerization of propylene) which provide this result include $EtAlCl_2$/$Bu_3N$/$TiCl_3$, $Et_3Al$/HPT/$TiCl_3$, and $Et_2AlCl$/HPT/$TiCl_3$ catalysts. HPT is hexamethylphosphoric triamide.

The preferred melt viscosity range for copolymers useful in this invention include about 15,000 to about 60,000 cp. at 190° C. The operable melt viscosity range is 10,000 to 200,000 cp. The melt viscosities described in this work were determined using a Tenius-Olsen Melt Indexer, using a 2160 g. weight and an 0.0825 inch diameter die at a melt temperature of 190° C. This poly(propylene-co-higher 1-olefin) can be used in amounts of about 35 percent to about 88 percent by weight, preferably about 48 percent to about 67 percent by weight.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such hydrocarbon tackifying resin is a hydrocarbon resin having a softening point of 130° C. and available commercially as Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. Examples of such commercially available resins of this type are Wingtack resins sold by the Goodyear Tire and Rubber Company and the Sta-Tac, Nirez and Betaprene H resins sold by the Reichhold Chemical Corporation.

Also other suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials Staybelite Ester 3, triethylene glycol ester of hydrogenated rosin, Foral 85 and 105, highly stabilized ester resins of pentaerythritol and rosin base.

The hydrocarbon resins, polyterpenes, and rosin esters can be used either alone or in combinations; however, in general, the better results have been obtained with the hydrocarbon resins used alone. These tackifying resins, which preferably have softening points of at least 100° C. and most preferably at least 120° C., can be used in amounts of about 10 percent to about 50 percent by weight of the adhesive composition, preferably about 25 percent to about 40 percent by weight.

The crystalline, hexane insoluble polypropylenes or propylene containing copolymers useful in the adhesive compositions of this invention are produced by the polymerization of propylene or propylene and ethylene in the presence of stereospecific catalysts. One method for preparing these polypropylenes or propylene containing copolymers is disclosed in U.S. Pat. No. 3,679,775. These polypropylenes or propylene containing copolymers are predominantly crystalline, i.e., hexane insoluble; however, they may contain a small amount of hexane soluble polymers in an amount up to about 10 percent by weight of the crystalline polymer. The crystalline propylene containing copolymers are crystalline ethylene/propylene copolymers containing not more than 20 percent by weight ethylene. These polypropylenes and crystalline propylene containing copolymers have melt viscosities of about 100 to about 100,000 cp. at 190° C., preferably about 250 to about 30,000 cp. at 190° C. These crystalline polypropylenes and propylene containing copolymers can be used in amounts of about 2 percent to about 15 percent by weight of the adhesive composition, preferably about 8 percent to about 12 percent by weight.

The adhesive compositions of this invention are prepared by blending together the components in the melt at a temperature of about 180° C. to about 230° C. until a homogeneous blend is obtained, approximately 2 hours. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot melt adhesive compositions.

In addition to the above listed components, it is desirable for the hot melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 220 and 330 [tris(di-t-butyl-p-hydroxybenzyl)-trimethylbenzene], Dalpac 4C2 [6-di(t-butyl)-p-cresol], Naugawhite (alkylated bisphenol), Butyl Zimate (zinc dibutyl dithiocarbamate), and Ethyl 702 [4,4'-methylene bis(2,6-di-tert-butylphenol)]. A particularly effective antioxidant is Irganox 1010 which is identified as tetrakis[methylene-3-(3',5'-di-t-butyl-4'-hydroxy-phenyl)propionate] methane when used in combination with Cyanox 1212 (American Cyanamid) which is laurylstearyl thiodipropionate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Poly(50-propylene-co-50-1-hexene) having a melt viscosity of 24,250 cp at 190° C. is melt blended with 40 weight percent hydrocarbon resin tackifier having a melt viscosity of 3000 cp. at 190° C. and a ring and ball softening point of 130° C. and 0.2 weight percent Irganox 1010 antioxidant in a glass tube at 200° C. under $N_2$ for one hour with mechanical stirring. The melt viscosity of the blend is 7,200 cp at 190° C. in a Tinius Olsen melt indexer. Lap shear (1 square inch overlap) and T-peel bonds are prepared in triplicate with high-density polyethylene test specimens (1 inch×4 inch×20 mils) using a melt temperature of 200° C. Test specimens are cleaned by washing them with pentane prior to making the bonds. Lap shear values (psi) are determined by ASTM D-1002 using a crosshead speed of 0.05 inch/minute at 23° C. T-peel values (pound/inch) are determined at a crosshead speed of 2 inches/minute at 23° C. using ASTM-D-1876. Creep resistance is determined at 23° C. by attaching a five pound weight to one end of a lap shear bond and clamping the other end of the bond to a support. The bond is allowed to remain under the attached load until the bond creeps sufficiently to fail or the test is terminated (after 139 hours).

This composition provides a strong T-peel bond strength of 22.6 pounds/inch and a strong lap shear bond strength of 16.5 psi; however, the bonds have inadequate creep resistance and they fail after only two hours.

Simple binary blends containing 20 to 30% hydrocarbon resin trackifier having a melt viscosity of 3000 cp. at 190° C. and a ring and ball softening point of 130° C. also have inadequate creep resistance. This example shows that binary blends of the copolymer and the hydrocarbon resin tackifier have inadequate creep resistance for use on polyethylene grocery bags.

EXAMPLE 2

The procedure of Example 1 is repeated except that poly(50-propylene-co-50-1-hexene) is blended with 40% hydrocarbon resin tackifier having a melt viscosity of 3000 cp. at 190° C. and a ring and ball softening point of 130° C. and 4% of thermally degraded crystalline polypropylene having a melt viscosity of 2100 cp. at 190° C. and a Tm of 155° C. The melt viscosity of the blend is 6,500 cp at 190° C. The T-peel bond strength of this composition is 16.6 pounds/inch on high density polyethylene sheeting, and the lap shear strength is 25.0 psi. The bonds have good creep resistance when tested at 23° C. using a five pound weight.

EXAMPLE 3

The procedure of Example 1 is repeated except that poly(50-propylene-co-50-1-hexene) is blended with 40% hydrocarbon resin tackifier having a melt viscosity of 3000 cp. at 190° C. and a ring and ball softening point of 130° C. and 7% thermally degraded crystalline polypropylene having a melt viscosity of 2100 cp. at 190° C. and a Tm of 155° C. This composition has a melt viscosity of 5900 cp at 190° C. and provides a good T-peel bond strength of 11.9 pounds/inch, and a strong lap shear bond strength of 32.9 psi. Lap shear bonds made with this composition show excellent resistance to creep. The creep test is terminated after 139 hours without any sign of failure.

EXAMPLE 4

The procedure of Example 1 is repeated except that poly(50-propylene-co-50-1-hexene) is blended with 40% hydrocarbon resin tackifier having a melt viscosity of 3000 cp. at 190° C. and a ring and ball softening point of 130° C. and 10% thermally degraded crystalline polypropylene having a melt viscosity of 2100 cp. at 190° C. and a Tm of 155° C. The addition of 10% degraded crystalline polypropylene to this composition provides a good T-peel bond strength of 11.4 pounds/inch, a very strong lap shear strength of 52.8 psi and excellent creep resistance (no failure after 139 hours—test terminated).

Similarly good results are obtained when polyterpene tackifier resins such as Nirez 1135 polyterpene resin is used instead of the hydrocarbon resin tackifier having a melt viscosity of 3000 cp. at 190° C. and a ring and ball softening point of 130° C.

EXAMPLE 5

The procedure of Example 1 is repeated except that a poly(65-propylene-co-35-1-hexene) having a melt viscosity of 22,000 cp at 190° C. is blended with 40% hydrocarbon resin tackifier having a melt viscosity of 3000 cp. at 190° C. and a ring and ball softening point of 130° C. and 10% thermally degraded crystalline polypropylene having a melt viscosity of 2100 cp. at 190° C. and a Tm of 155° C. Excellent T-peel and lap shear bond strength values and excellent creep resistance values are obtained which are similar to those obtained in Example 4.

EXAMPLE 6

The procedure of Example 1 is repeated except that a poly(50-propylene-co-50-1-hexene) having a melt viscosity of 20,500 cp at 190° C. is blended with 40% hydrocarbon resin tackifier having a melt viscosity of 3000 cp. at 190° C. and a ring and ball softening point of 130° C. and 10% thermally degraded crsytalline polypropylene which has been modified with maleic anhydride and has a melt viscosity of 370 cp. at 190° C., melting point of 157° C. and an acid number of 47. The blend has a melt viscosity of 4,000 cp at 190° C. The strong T-peel and lap shear bonds obtained on high-density polyethylene and the excellent creep resistance are similar to that obtained in Example 4. This example shows that low viscosity polypropylene having a high acid number of 47 is just as effective as the unmodified low viscosity crystalline polypropylene having a melt viscosity of 2100 cp. at 190° C. and a Tm of 155° C. in the blends.

EXAMPLE 7

The procedure of Example 1 is repeated except that a poly(33-propylene-co-67-1-hexene) having a melt viscosity of 22,000 cp at 190° C. is blended with 40% hydrocarbon resin tackifier having a melt viscosity of 3000 cp. at 190° C. and a ring and ball softening point of 130° C. and 10% thermally degraded crystalline polypropylene having a melt viscosity of 2100 cp. at 190° C. and a Tm of 155° C. The excellent adhesion of this composition to polyethylene is shown by a T-peel strength of 25 pounds/inch, a lap shear bond strength of 65 psi and no failure in the creep test after >139 hours.

EXAMPLE 8

The procedure of Example 1 is repeated except that a poly(50-propylene-co-50-1-hexene) having a melt viscosity of 200,000 cp at 190° C. is blended with 40% hydrocarbon resin tackifier having a melt viscosity of 3000 cp. at 190° C. and a ring and ball softening point of 130° C. and 10% thermally degraded crystalline polypropylene having a melt viscosity of 2100 cp. at 190° C. and a Tm of 155° C. The adhesive composition has a melt viscosity of 24,000 cp at 190° C. and is applied with a Possis Model 1114 extruder because of the relatively high melt viscosity of the blend. The bonds prepared on both low- and high-density polyethylene exceed the strength of the polyethylene substrates in both T-peel and lap shear bond tests with elongation and fracture of the substrate occurring rather than fracture of the bonds. The bonds do not creep when tested with a five pound weight.

EXAMPLE 9

The procedure of Example 1 is repeated except that poly(55-propylene-co-45-1-octene) having a melt viscosity of 25,300 cp at 190° C. is blended with 40% hydrocarbon resin tackifier having a melt viscosity of 3000 cp. at 190° C. and a ring and ball softening point of 130° C. and 10% thermally degraded crystalline polypropylene having a melt viscosity of 2100 cp. at 190° C. and a Tm of 155° C. The strong T-peel and lap shear bonds and the excellent creep resistance obtained on high-density polyethylene are similar to that obtained in Example 4.

Similarly good results are obtained with a blend of poly(52-propylene-co-48-1-decene) having a melt viscosity of 32,000 cp at 190° C. with 40% hydrocarbon resin tackifier having a melt viscosity of 3000 cp. at 190° C. and a ring and ball softening point of 130° C. and 10% thermally degraded crystalline polypropylene having a melt viscosity of 2100 cp. at 190° C. and a Tm of 155° C.

EXAMPLE 10

The composition described in Example 4 is used to construct a high-density polyethylene grocery bag using 3 mil polyethylene film. The adhesive is applied to the film at a melt temperature of 177° C. using a Nordson hand gun to form a side seam and bottom flap. The formed bag is filled with a representative load of groceries consisting of canned goods, sugar, coffee, flour, eggs and bread. The filled bag is hand carried in extensive tests on three separate days to duplicate the handling encountered in transporting groceries from the supermarket to home by a consumer. The polyethylene bag bonded with the adhesive compositions described in Example 4 does not creep, tear, or rupture in any way and is completely satisfactory in its performance. The bag is still usable after these tests.

Although the invention has been described in considerable detail with particular reference to certain preferred embodiments thereof, variations and modifications can be effected within the spirit and scope of the invention.

We claim:

1. An adhesive composition capable of being used as a hot-melt adhesive comprising a blend of
   (1) 35 to 88 weight percent substantially amorphous poly(propylene-co-higher 1-olefin), in which the 1-olefin is a member of the group consisting of 1-hexene, 1-heptene, 1-octene, 1-nonene, and 1-decene, having a melt viscosity of about 10,000 to about 200,000 cp. at 190° C.,
   (2) 10 to 50 weight percent of at least one tackifying resin having a softening point of at least 100° C. selected from the group consisting of hydrocarbon resins, polyterpene resins, and rosin esters, and
   (3) 2 to 15 weight percent crystalline polypropylene or crystalline propylene/ethylene copolymers containing not more than 20 percent by weight ethylene, said polypropylene or propylene/ethylene copolymer having a melt viscosity of about 100 to 100,000 cp. at 190° C.

2. An adhesive composition according to claim 1 wherein said poly(propylene-co-higher 1-olefin) is a propylene/1-hexene copolymer containing 35 to 65 mole percent of 1-hexene.

3. An adhesive composition according to claim 2 wherein said tackifying resin is hydrocarbon resin having a softening point of at least 100° C.

4. An adhesive composition according to claim 3 wherein said tackifying resin is a polyterpene resin having a softening point of at least 100° C.

5. An adhesive composition capable of being used as a hot-melt adhesive comprising a blend of
   (1) 48 to 67 weight percent substantially amorphous poly(propylene-co-higher 1-olefin), in which the 1-olefin is a member of the group consisting of 1-hexene, 1-heptene, 1-octene, 1-nonene, and 1-decene, having a melt viscosity of about 10,000 to about 200,000 cp. at 190° C.,
   (2) 25 to 40 weight percent of at least one tackifying resin having a softening point of at least 100° C. selected from the group consisting of hydrocarbon resins, polyterpene resins, and rosin esters, and
   (3) 8 to 12 weight percent crystalline polypropylene or crystalline propylene/ethylene copolymers containing not more than 20 percent by weight ethylene, said polypropylene or propylene/ethylene copolymer having a melt viscosity of about 100 to 100,000 cp. at 190° C.

6. An adhesive composition according to claim 5 wherein said poly(propylene-co-higher 1-olefin) is a propylene/1-hexene copolymer containing 35 to 65 mole percent of 1-hexene.

7. An adhesive composition according to claim 6 wherein said tackifying resin is hydrocarbon resin having a softening point of at least 100° C.

8. An adhesive composition according to claim 6 wherein said tackifying resin is a polyterpene resin having a softening point of at least 100° C.

* * * * *